INVENTORS
F. L. Le Bus, Jr
R. E. Smith
R. A. Crowley
BY William S. Dorman
ATTORNEY INVENTORS
F. L. LeBus, Jr.
R. E. Smith
R. A. Crowley
BY William S. Dorman
ATTORNEY

United States Patent Office 3,171,633
Patented Mar. 2, 1965

3,171,633
SWIVELING SINGLE SHEAVE
Franklin L. Le Bus, Jr., Reynold E. Smith, and Robert A. Crowley, Longview, Tex., assignors to Lebus Royalty Company, Longview, Tex., a partnership
Filed Aug. 1, 1962, Ser. No. 214,050
4 Claims. (Cl. 254—190)

This invention relates to improvements in sheaves and more particularly, but not by way of limitation, to a single swiveling sheave having a locking mechanism therefor and a built-in line guard structure.

Swiveling sheaves of the type commonly known as fairleaders are in widespread use today for receiving or supporting cables for a variety of purposes, such as cable or lines utilized for the handling of buckets, grapples, or other equipment adapted to be raised and lowered or otherwise manipulated by the line or cable. It is usually desirable to provide a swiveling type sheave structure in order to permit orientation or positioning of the plane of the sheave at the optimum angle with respect to the operation of the cable being utilized therewith. However, it is often found that a freely movable or pivotal sheave of this type may swivel or move accidentally to an undesirable angular disposition if there is slack in the line for any reason.

The present invention contemplates a novel swiveling sheave device adapted for angular adjustment of the plane of the sheave as desired, and particularly designed and constructed for locking the sheave in the predetermined position in order to preclude accidental pivoting or swiveling of the sheave during operation thereof in the event that slack occurs in the line. In addition, the novel sheave device is provided with a built-in line guard arrangement which substantially precludes accidental or undesirable loss of the cable from the sheave groove during operation of the apparatus. The swiveling sheave apparatus may be readily installed in substantially any desired location for operation thereof. The device is a simple and compact structure which is a complete unit in itself, and is provided with a minimum of working parts. Thus, a minimum of effort and time is required for installation and maintenance of the apparatus.

It is an important object of this invention to provide a novel sheave apparatus adapted to be swiveled to substantially any angular disposition for the plane of the sheave in accordance with the optimum position therefor during operation.

Another object of this invention is to provide a novel swiveling sheave apparatus particularly designed and constructed for locking the sheave in the desired preselected angular disposition therefor.

It is another object of this invention to provide a novel swiveling sheave apparatus having a built-in line guard arrangement for substantially precluding accidental disengagement of the cable with the sheave groove during operation of the device.

Still another object of this invention is to provide a novel locking swiveling sheave apparatus having a built-in guard structure which is a complete unit in itself for facilitating the installation and maintenance thereof during utilization.

A further object of this invention is to provide a novel swiveling sheave device which is simple and efficient in operation and economical and durable in construction.

Other and further objects and advantageous features of the present invention will hereinafter more fully appear in connection with the detailed description of the drawings in which.

Figure 1:
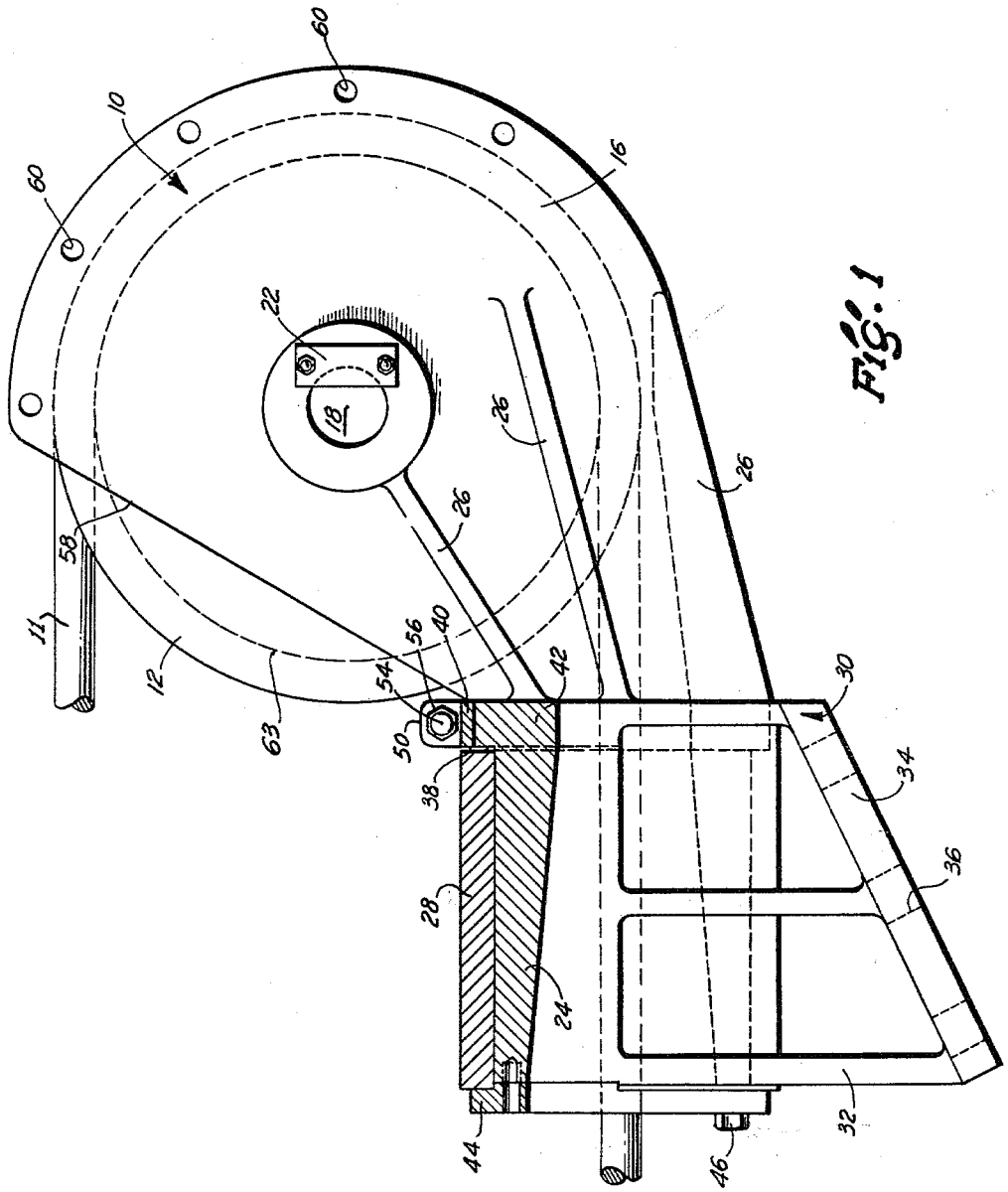
FIGURE 1 is a side elevational view partly in section of a swiveling sheave apparatus embodying the invention.

Referring to the drawings in detail, reference character 10 generally indicates a sheave apparatus comprising a pulley or sheave member 12 journalled between a pair of spaced side plates 14 and 16. The sheave 12 is preferably carried or mounted on a shaft 18 extending between the side plates 14 and 16 and having the opposed ends thereof journalled in suitable anti-friction bearings (not shown) to provide for rotation of the sheave 12. A pair of retainer plate members 20 and 22 may be bolted, or otherwise removably secured to the side plates 14 and 16, respectively, adjacent the outer ends of the shaft 18 for retaining the shaft in position between the side plates.

The side plates 14 and 16 are carried by a shank member 24 and are supported therefrom by a plurality of angular arms or spider members 26 whereby the side plates and shank 24 are an integral unit. The shank 24 is rotatably disposed within an outer housing or bushing sleeve 28 which in turn is rigidly secured to or carried by a base portion 30. The base portion 30 may be of any suitable type, and as depicted herein, is provided with a plurality of downwardly extending leg members or supports 32 terminating in an angularly disposed base plate member 34. The base 34 is provided with a plurality of apertures 36 whereby the entire base portion 30 may be bolted to a suitable foundation or support in accordance with the installation with which the apparatus 10 is to be utilized.

The bushing housing 28 is provided with a slit or saw cut 38 which preferably extends around substantially half the circumference thereof and is spaced from one end thereof as clearly shown in FIGURE 1. The portion 40 of the bushing housing 28 which is thus severed or distinguished by the semicircular saw cut 38 is cut away or machined to provide a relatively thinner side wall throughout the entire circumference thereof, thus providing a locking band at one end of the housing 28. The shank 24 is enlarged at 42 to provide an outwardly extending circumferential shoulder for engaging the inner perphery of the locking band 40 and for abutting the cut portion 38 for positioning the shank 24 within the bushing housing 28. In addition, an annular plate 44 is removably secured to the opposite end of the shank 24 by a plurality of bolts 46, or the like, only one of which is shown in the drawings, for engaging the opposite end of the housing 28 to retain the shank 24 therein.

Figure 2:
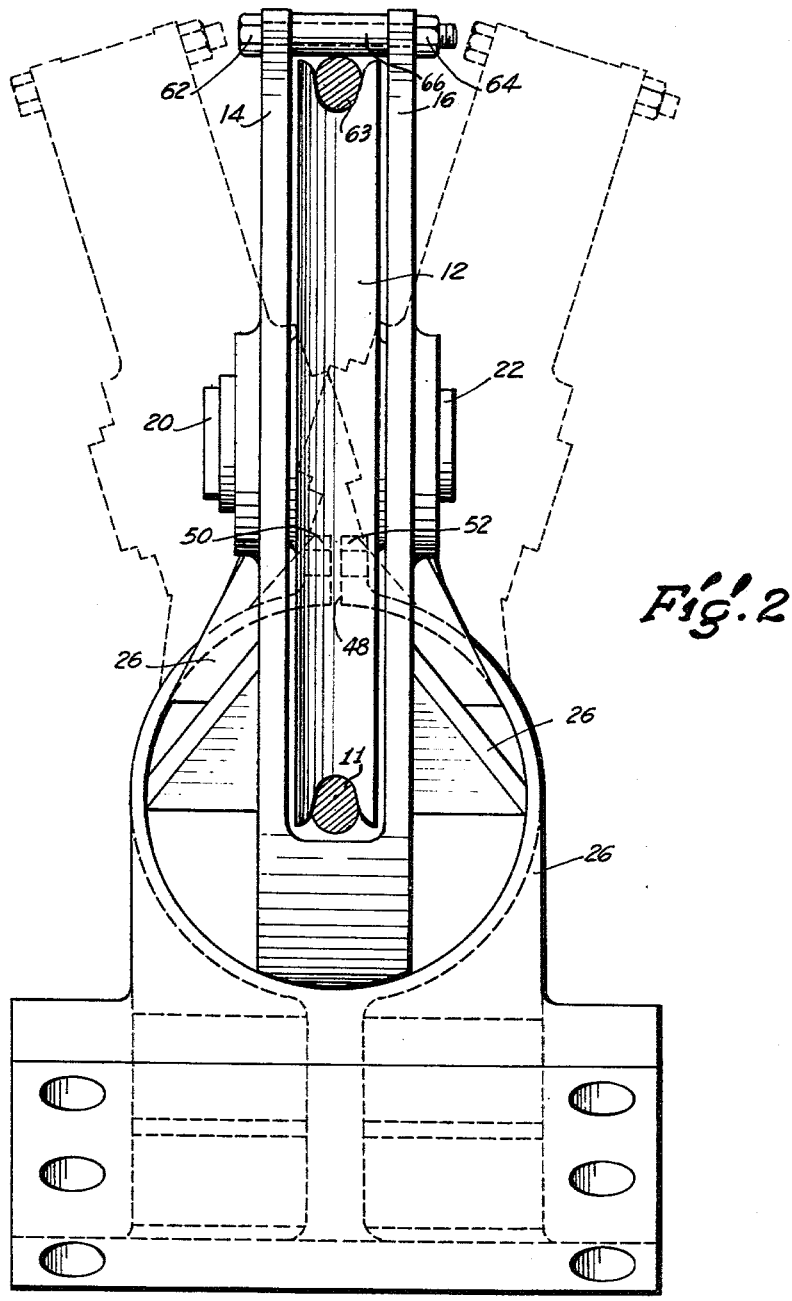
FIGURE 2 is a front elevational view of a swiveling sheave apparatus embodying the invention with variable angular positions thereof depicted in dotted lines for purposes of illustration.

The locking band 40 is discontinuous at the substantial center thereof oppositely disposed from the base portion 30, as shown at 48 in FIGURE 2. The opposed ends of the band 40 thus formed are provided with outwardly extending apertured flanges 50 and 52 for receiving a stud or bolt member 54 therethrough. The bolt member 54 and cooperating nut 56 may be utilized in the usual manner whereby the bolt 54 may be rotated in one direction for moving the flanges 50 and 52 in directions toward each other for tightening the band 40 around the outer periphery of the shoulder 42. Conversely, the bolt 54 may be rotated in a reverse direction for moving the flanges 50 and 52 in directions away from each other, or the bolt 54 may be completely removed from the flanges, as shown in FIGURE 2, in order to loosen the engagement between the band 40 and the outer periphery of the shoulder 42.

The side plates 14 and 16 may be cut away as shown at 58 in FIGURE 1 for facilitating access to the sheave 12 therebetween. In addition, the plates 14 and 16 are provided with a plurality of circumferentially spaced aligned apertures 60 extending around a portion of the outer circumference thereof for receiving bolt members 62 therethrough. The apertures 60 are disposed on a radius slightly greater than the radius defined by the cable 11 when disposed in the groove 63 of sheave 12. The bolts or studs 62 may be secured in position by suitable nut members 64, and it is preferable to provide a spacer sleeve 66 around each bolt 62 and interposed between the plates 14 and 16. The bolts 62 and sleeves 66 combined with the plates 14 and 16 provide a built-in line guard for the cable (not shown) disposed in the groove 63 to substantially preclude any accidental loss of the cable from the groove during operation of the sheave apparatus 10.

*Operation*

The sheave apparatus 10 may be quickly and easily installed at substantially any location wherein a cable or line 11 is to be utilized for manipulation of any equipment. The base portion 30 may be bolted to the desired support structure (not shown) for securing the apparatus 10 at the location for receiving the cable. Whereas, the particular base portion 30 depicted herein is provided with an angularly disposed base plate 34, it is to be understood that the disposition of the base plate may be as desired in accordance with the particular installation.

The cable or line 11 may be passed through the interior of the shank 24 and disposed in the groove 63 of the sheave 12 in any well known manner. Of course, the bolts 62 and sleeves 66 may be removed from the apertures 60 for facilitating disposition of the cable in the groove 63, if desired, or the cable may be threaded into the groove with the bolts and sleeves in position between the plates 14 and 16.

The band 40 may be loosened with respect to the outer periphery of the shoulder 42 by relieving the engagement therebetween through the use of the bolt 54 and flanges 50 and 52, as hereinbefore set forth. Thus, the shank 24 and plates 14 and 16 having the sheave 12 journalled therebetween may be adjusted to any desired angular position as shown in dotted lines in FIGURE 2. With the sheave 12 disposed in the optimum angular position in accordance with the operating conditions for the apparatus 10, the locking band 40 may then be securely tightened around the shoulder 42 by the bolt 54 and flanges 50 and 52. This locking engagement between the band 40 and the shoulder 42 substantially precludes any accidental swiveling or pivoting of the shank 24 within the bushing housing 28, thus securely maintaining the plane of the sheave 12 in the preselected angular position, regardless of any slack which may occur in the cable during the manipulation of the equipment (not shown).

In addition, the side plates 14 and 16 in combination with the bolts 62 and sleeves 66 provide a built-in line guard which substantially precludes any loss of the cable from the groove 63 of the sheave 12. In this manner, the cable is maintained efficiently engaged with the sheave apparatus 10 regardless of any unexpected slackness which may occur in the cable, or other operating conditions encountered in the operation of the device.

From the foregoing, it will be apparent that the present invention provides a novel swiveling sheave structure wherein the plane of the sheave may be easily adjusted to substantially any desired preselected angular disposition, and securely locked in the selected position to preclude accidental swiveling of the sheave during operation of the device. Furthermore, the apparatus is provided with a built-in line guard which efficiently precludes loss of the cable or line from the groove of the sheave. The novel swiveling sheave apparatus is a complete unit in itself, and may be quickly and easily installed in any desired location for receiving cable or line being utilized for the manipulation of any type of equipment. The novel sheave apparatus is simple and efficient in operation and economical and durable in construction.

Whereas, the present invention has been described in particular relation to the drawings attached hereto, it should be understood that other and further modifications, apart from those shown or suggested herein, may be made within the spirit and scope of this invention.

What is claimed is:

1. A swiveling sheave device comprising a bushing housing, a shank portion journalled in the bushing housing, a locking band carried by the bushing housing for locking the shank portion in substantially any prelected angular disposition in the bushing housing, plate means carried by the shank portion and movable therewith, a sheave journalled in the plate means for receiving a cable, and means carried by the plate means and cooperating therewith to provide a cable guard for the device and retain the cable in position around the sheave.

2. A swiveling sheave device comprising a bushing housing, a shank portion journalled in the bushing housing, a locking band carried by the bushing housing for locking the shank portion in substantially any prelected angular disposition in the bushing housing, a pair of spaced plate members carried by the shank portion and movable therewith, sheave means journalled between the plate members for receiving a cable, and means carried by the plate members and cooperating therewith for providing a cable guard for the device and retain the cable in position around the sheave.

3. A swiveling sheave device as set forth in claim 2 wherin the last mentioned means comprises a plurality of circumferentially spaced stud members extending between the plate members.

4. A swiveling sheave device comprising a bushing housing, base means secured to the bushing housing for mounting the device in the desired location, a shank portion journalled within the bushing housing, a locking band carried by the bushing housing and cooperating with the shank portion for locking the shank portion in substantially any preselected angular position within the bushing housing, a pair of spaced side plate members carried by the shank portion and extending outwardly therefrom, a grooved sheave journalled between the side plate members for receiving a cable, said side plates and sheave movable with the shank portion to provide for variable angular disposition of the plane of the sheave in accordance with the operating conditions, and a plurality of spaced stud members extending between the side plates and spaced slightly radially outward from the sheave for cooperating with the side plates to provide a cable guard for the device and retain the cable within the groove.

References Cited by the Examiner

UNITED STATES PATENTS

| | | | |
|---|---|---|---|
| 806,534 | 12/05 | Friedline | 254—190 |
| 1,373,130 | 3/21 | Hahn | 254—197 |
| 1,805,800 | 5/31 | Berger | 254—190 |
| 1,955,942 | 4/34 | Bush | 254—190 |
| 2,168,463 | 8/39 | Wunsch | 254—190 |
| 2,291,894 | 8/42 | Gwinn | 254—195 |
| 2,762,606 | 9/56 | Morse | 254—190 |
| 2,802,639 | 8/57 | Troyer | 254—194 |

SAMUEL F. COLEMAN, *Primary Examiner.*

JOSEPH P. STRIZAK, ROBERT B. REEVES,

*Examiners.*